US008039747B2

(12) United States Patent
Neuroth et al.

(10) Patent No.: US 8,039,747 B2
(45) Date of Patent: Oct. 18, 2011

(54) HIGH VOLTAGE ELECTRIC SUBMERSIBLE PUMP CABLE

(75) Inventors: David H. Neuroth, Claremore, OK (US); Larry V. Dalrymple, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 272 days.

(21) Appl. No.: 12/362,021

(22) Filed: Jan. 29, 2009

(65) Prior Publication Data

US 2010/0186990 A1 Jul. 29, 2010

(51) Int. Cl.
*H02G 7/00* (2006.01)

(52) U.S. Cl. ........... 174/110 R; 174/120 R; 174/120 AR

(58) Field of Classification Search .............. 174/102 R, 174/102 C, 102 SP, 103, 105, 107, 108, 109, 174/23 R, 23 C, 28, 110 R, 120 R, 120 SR, 174/120 AR See application file for complete search history.

(56) References Cited

U.S. PATENT DOCUMENTS

| | | | | | |
|---|---|---|---|---|---|
| 3,573,210 | A | | 3/1971 | Furusawa et al. | |
| 3,649,542 | A | | 3/1972 | Hasebe et al. | |
| 3,831,636 | A | * | 8/1974 | Bittner | 138/173 |
| 3,832,481 | A | * | 8/1974 | Boyd et al. | 174/102 R |
| 3,923,676 | A | | 12/1975 | Rasanen | |
| 4,096,351 | A | * | 6/1978 | Wargin et al. | 174/102 R |
| 4,284,841 | A | * | 8/1981 | Tijunelis et al. | 174/103 |
| 4,600,805 | A | * | 7/1986 | Glynn et al. | 174/102 R |
| 4,658,089 | A | * | 4/1987 | Guzy et al. | 174/113 R |
| 4,675,474 | A | * | 6/1987 | Neuroth | 174/102 R |
| 4,780,574 | A | * | 10/1988 | Neuroth | 174/102 D |
| 4,840,983 | A | * | 6/1989 | Vincent | 524/265 |
| 5,246,783 | A | | 9/1993 | Spenadel et al. | |
| 5,414,217 | A | * | 5/1995 | Neuroth et al. | 174/120 R |
| 5,459,286 | A | | 10/1995 | Bergman et al. | |
| 6,596,393 | B1 | * | 7/2003 | Houston et al. | 428/389 |
| 6,600,108 | B1 | | 7/2003 | Mydur et al. | |
| 6,918,788 | B2 | | 7/2005 | Cavanaugh | |
| 6,924,436 | B2 | | 8/2005 | Varkey et al. | |
| 7,288,721 | B2 | | 10/2007 | Varkey et al. | |
| 7,414,202 | B2 | | 8/2008 | Lee et al. | |
| 7,611,339 | B2 | * | 11/2009 | Tetzlaff et al. | 417/422 |
| 2006/0065429 | A1 | | 3/2006 | Kim et al. | |
| 2006/0137898 | A1 | | 6/2006 | Kim et al. | |

FOREIGN PATENT DOCUMENTS

| | | | | |
|---|---|---|---|---|
| EP | 0 880 147 | A1 | | 11/1998 |
| JP | 1-283716 | | * | 11/1988 |

* cited by examiner

*Primary Examiner* — William Mayo, III
(74) *Attorney, Agent, or Firm* — Bracewell & Giuliani LLP

(57) ABSTRACT

A cable for transmitting high voltage electricity for use with an electric submersible pump has a plurality of solid conductors for conducting electricity along the length of the cable. The solid conductors are uniformly and firmly bonded to the surrounding insulation with a thin bonding layer applied directly over the conductor. A layer of conductive fabric tape surrounds the insulation to form an outer stress control layer. The insulated conductors are surrounded by an extruded layer of lead. A second layer of fabric tape surrounds the lead. An armored outer layer surrounds the insulated conductors and the lead. Space between the insulated and wrapped conductors and the armored outer layer is filled with a jacket material.

17 Claims, 4 Drawing Sheets

HIGH VOLTAGE ELECTRIC SUBMERSIBLE PUMP CABLE

FIELD OF THE INVENTION

The present invention relates to electrical cables of the type used in electric submersible well pumps and the like.

BACKGROUND OF THE INVENTION

Electrical cables are used to interconnect electric motors to submersible pumps or other equipment in oil and gas wells. These cables ordinarily consist of three solid or stranded electrical conductors that are combined into a single cable.

Historically, electrical cables for submersible pumps have been rated for low voltage in the range of 5 kV and most electric submersible pump (ESP) motors have had name plate voltage below 5 kV. With the increasing demand for higher horsepower, ESP motors are now being built with name plate voltages greater than 5 kV requiring manufacturers to design cables with higher rating such as 8 kV. As the voltage of the electrical cables increase, the presence of any voids between the conductors and the insulation in an electrical cable can result in partial discharge. It is important to provide a higher voltage (greater than 5 kV) ESP cable with improved electrical strength and reduced partial discharge characteristics.

SUMMARY OF THE INVENTION

A power cable for an electric submersible pump assembly is constructed with improved electrical strength and reduced partial discharge characteristics. One embodiment of the present invention utilizes solid conductors that are uniformly and firmly bonded to the surrounding insulation with a thin bonding layer applied directly over the conductor. The bonding layer has a thickness between 0.00002 inches and 0.005 inches. In a preferred embodiment, the bonding layer is non-conductive. A layer of conductive fabric tape is wrapped tightly around the insulation to form an outer stress control layer. The insulated conductors may be covered with an extruded layer of lead, which may then be wrapped with a fabric tape to protect the lead layer during subsequent processing steps. An armored outer layer is then applied around the insulated conductors. Space between the insulated and wrapped conductors and the armored outer layer may be filled with a jacket material.

DETAILED DESCRIPTION OF THE INVENTION

Figure 1:
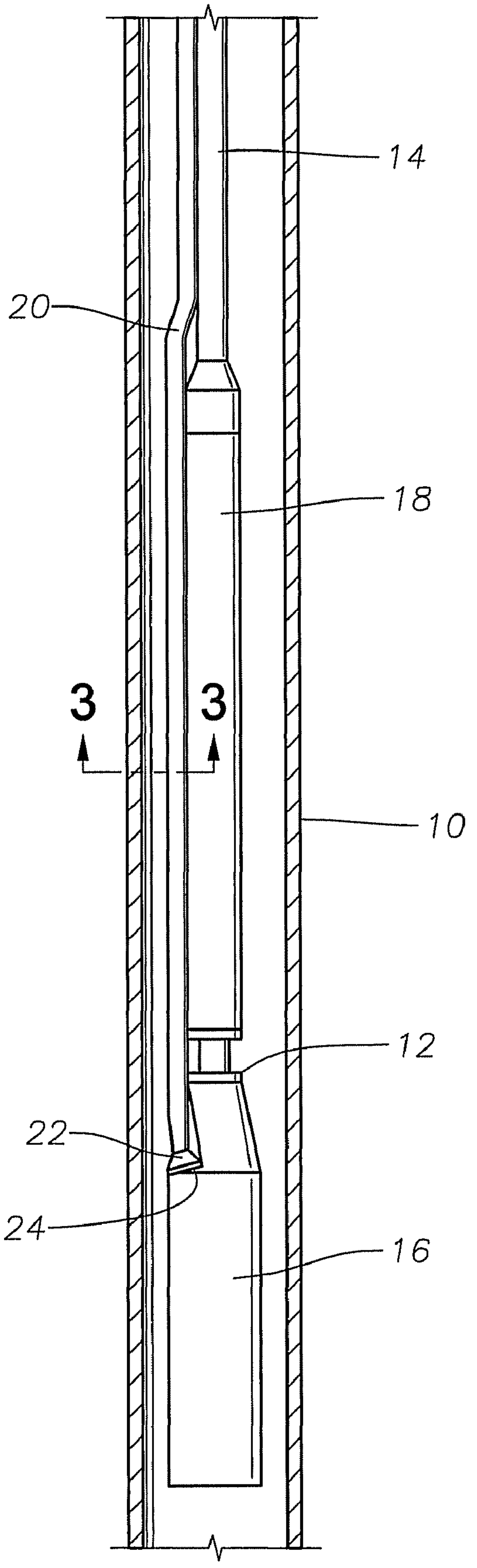
FIG. 1 is an elevational view of a well within which an electric submersible pump is disposed.

FIG. 1 is an elevational section view of a well 10 having an electric submersible pump 12 disposed therein, mounted to a string of tubing 14. Pump 12 includes an electric motor 16 and a pump section comprising a centrifugal pump assembly 18. A cable 20 extends downhole, terminating in a motor lead to provide power to an electric motor 16. A pothead connector

22 is mounted to the motor lead of cable 20, and electrically connects and secures the motor lead of cable 20 to the housing 24 of motor 16.

Figure 2:
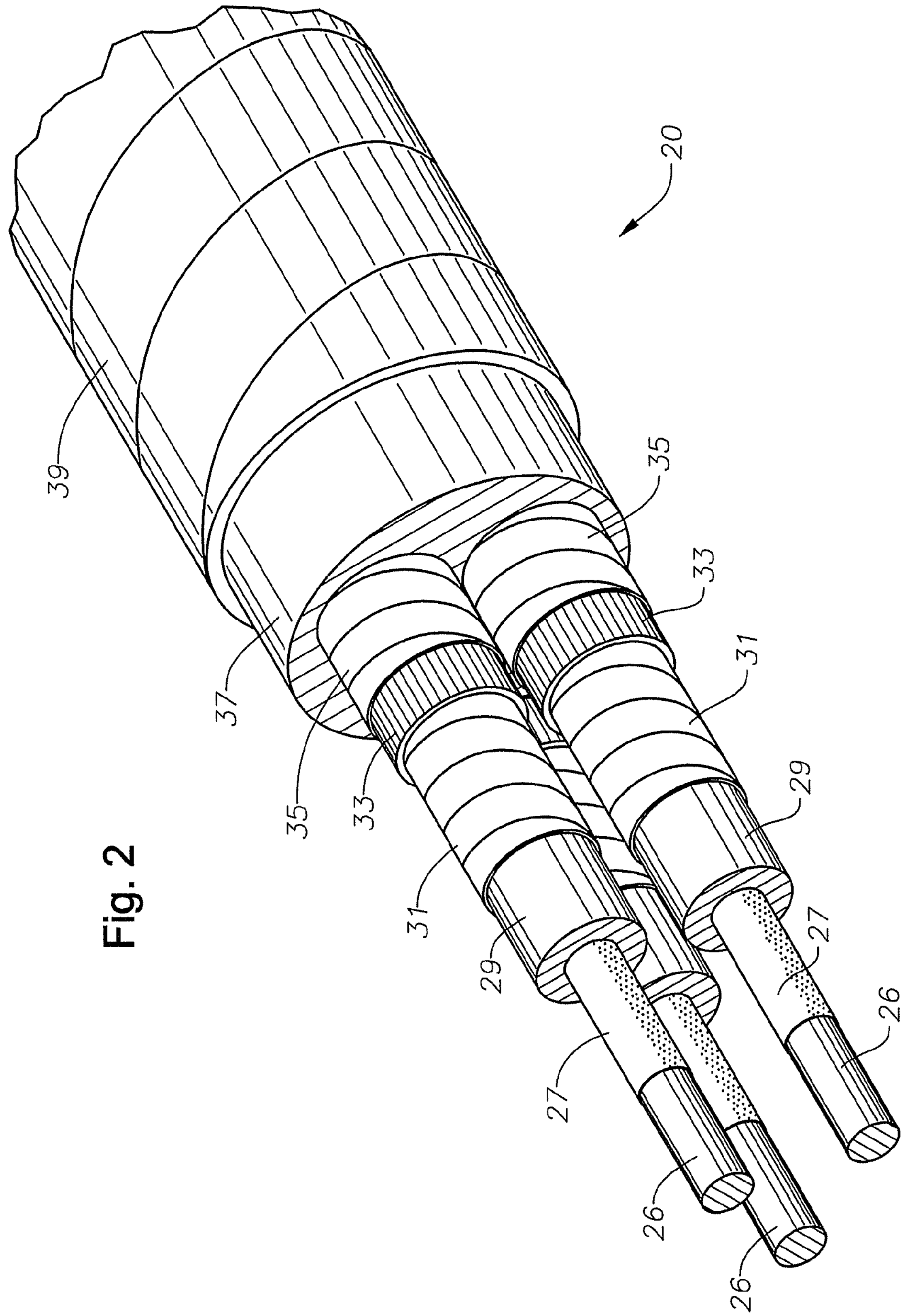
FIG. 2 is a cross-sectional perspective view of a high voltage electric submersible pump cable of the present invention.
Figure 3:
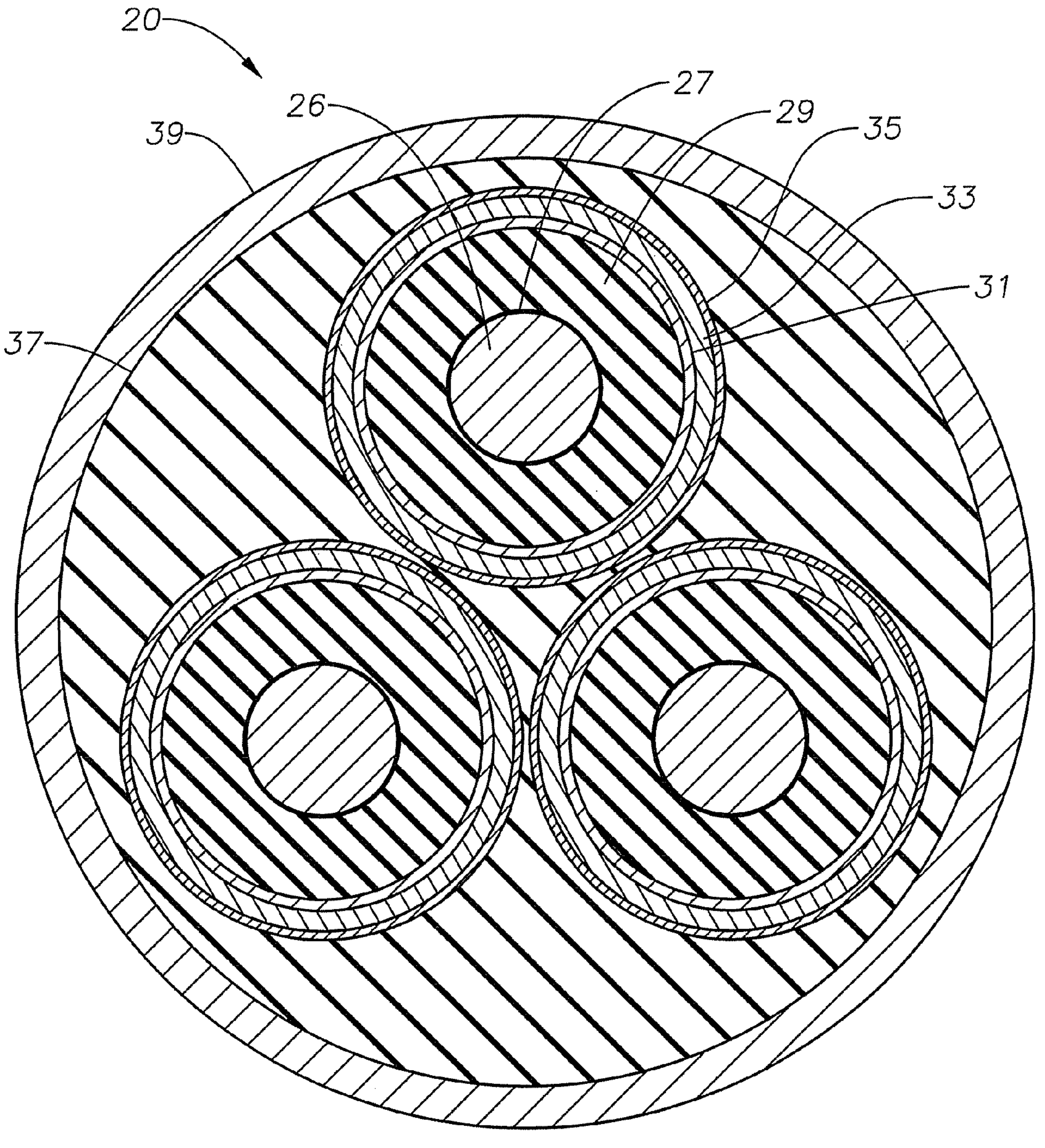
FIG. 3 is a cross sectional view taken along the line 3-3 of FIG. 1.

Referring to FIGS. 2 and 3, cable 20 comprises three solid conductors 26 that transmit electricity along the length of cable 20. Cable 20 may contain a different number of conductors depending upon the application. Conductors 26 are constructed of conductive materials such as copper. A thin bonding layer 27 is applied directly over and surrounds each of the conductors 26. Bonding layer 27 may be a vulcanizing metal primer, an adhesive such as cyanoacrylate adhesive, epoxy adhesive, light curing adhesive, polyurethane adhesive, and silicon adhesive, or a combination primer/adhesive. A layer of insulation 29 is extruded over the conductors 26 and bonding layer 27. The conductors 26, bonding layer 27, and insulation 29 are cured, thereby uniformly and firmly bonding the insulation 29 to the conductors 26 with the thin bonding layer 27. The bonding layer 27 has a maximum thickness of 0.005 inches and a minimum thickness of 0.00002 inches and has a bond strength in excess of 5 lbf/in. In the preferred embodiment the bonding layer 27 is non-conductive, although alternate embodiments using a conductive bonding layer may be employed. Insulation 29 is typically not electrically conductive.

Figure 4:
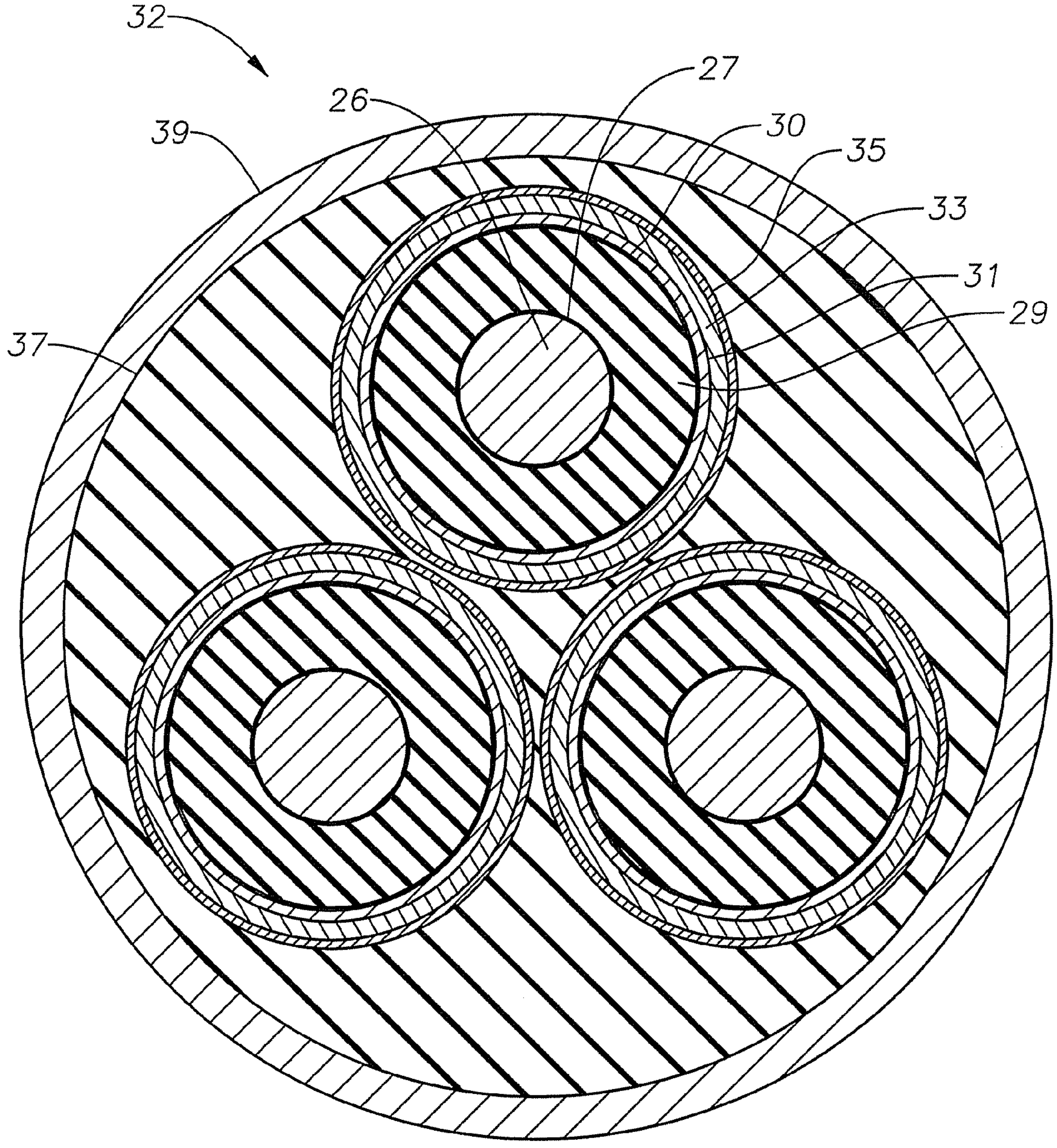
FIG. 4 is a cross sectional view of an alternate embodiment high voltage electric submersible cable of the present invention.

An outer stress control layer 31 surrounds the conductors 26, bonding layer 27, and insulation 29. In a preferred embodiment, the outer stress control layer 31 is a conductive fabric tape wrapped tightly around the insulation 29. The tape serves to make intimate electrical contact with the insulation 29 thereby greatly reducing or eliminating voids which can cause partial discharge. The fabric tape also serves the function of helping to contain the insulation 29 during decompression of the cable 20. As an alternative to the outer stress control layer 31 of conductive fabric tape, in an alternate embodiment, conductive braids can be wrapped tightly around the insulation 29. Referring to FIG. 4, another alternate embodiment cable 32 that reduces partial discharge employs a conductive paint 30 applied under the fabric tape or conductive braids to eliminate any air gaps between the outer surface of the insulation 29 and the conductive material 31. Another alternate embodiment employs an extruded thermosetting stress control layer over the insulation 29.

Referring back to FIGS. 2 and 3, the conductors 26, bonding layer 27, insulation 29, and outer stress layer 31 may be surrounded by an extruded layer of lead 33. This outer layer of lead 33 prevents or greatly reduces the ingress of gasses and liquids into the cable 20. The outer layer of lead 33 also carries away leakage currents from the surface of the cable.

The conductors 26, bonding layer 27, insulation 29, outer stress layer 31, and lead 33 may be surrounded by a fabric tape 35 to protect the lead layer 33 during subsequent processing steps. The fabric tape 35 is wrapped around the lead layer 33 of the cable 20. A jacket 37 is extruded around the three insulated conductors 26. The center space between the three fully insulated conductors 26 is also filled with the jacket material 37. Insulation 29 and jacket material 37 can be constructed from various polymer compounds, including: EPDM rubber (Ethylene Propylene diene monomer), nitrile rubber, HNBR rubber, aflas rubber, FKM rubber, polypropylene, polyethylene, cross-linked PE or PP, thermoplastic elastomers, fluoropolymers, thermoplastics or thermoset elastomers. Typically, the finished three conductor high voltage ESP cable 20 has an armored outer layer 39, which may be made of metal strip wrapped and formed around jacket 37. The purpose of the jacket material 37 is to support the conductors 26 and keep them tightly held in place by the armor 39.

Using solid conductors with insulation bonded to the conductors by a bonding layer offers several advantages. Unlike stranded conductors, solid conductors do not provide spaces for gasses to collect between the strands, improving the decompression resistance of the cable. Additionally, solid conductors are smaller than stranded conductors, allowing more space for insulation. By bonding the insulation to the solid conductors, the bonding helps prevent damage during splicing operations, improves decompression resistance, and eliminates voids that are a source of partial discharge under high AC voltage conditions. The high bond strength of the bonding layer prevents insulation damage during the handling of the cable, while also improving decompression resistance. The outer stress control layer serves a dual purpose of partial discharge mitigation and decompression containment.

While the invention has been shown in only one of its forms, it should be apparent to those skilled in the art that it is not so limited but is susceptible to various changes without departing from the scope of the invention. For example, although the cable is shown with a round, circular geometry, it could have a flat, rectangular geometry.

The invention claimed is:

1. A high voltage electrical cable comprising:
- at least one conductor for conducting electricity along a length of the cable;
- a layer of insulation uniformly and firmly bonded to the at least one conductor by a thin bonding layer applied directly over the at least one conductor;
- a layer of electrically conductive fabric tape surrounding the layer of insulation;
- an extruded layer of lead surrounding the layer of electrically conductive fabric tape;
- a layer of jacket material surrounding the extruded layer of lead; and
- an outer armor surrounding the layer of jacket material.

2. The cable of claim 1, further comprising a layer of electrically conductive paint applied to the outer surface of the insulation, between the insulation and the layer of electrically conductive fabric tape.

3. The cable of claim 1, wherein the bonding layer is between 0.00002 inches and 0.005 inches thick.

4. The cable of claim 1, wherein the bond strength of the bonding layer is greater than 5 lbf/in.

5. The cable of claim 1, further comprising a layer of fabric tape wrapped tightly around the extruded layer of lead.

6. The cable of claim 1, wherein the at least one conductor is solid.

7. The cable of claim 1, wherein the bonding layer is non-conductive.

8. The cable of claim 1, wherein the jacket material is rubber.

9. The cable of claim 1, wherein the thin bonding layer is conductive.

10. A high voltage electrical cable, comprising:
- a plurality of solid conductors for conducting electricity along a length of the cable at a voltage greater than 5 kV;
- a layer of insulation uniformly and thinly bonded to the each of the plurality of solid conductors by a thin bonding layer applied directly over each of the plurality of solid conductors, wherein the bonding layer is between 0.00002 inches and 0.005 inches thick;
- a layer of conductive paint applied directly over and surrounding the layer of insulation;
- an extruded layer of lead surrounding the layer of conductive paint;
- a single layer of jacket material surrounding all of the extruded layers of lead; and
- an outer armor surrounding the layer of jacket material.

11. The cable of claim 10, wherein the bond strength of the bonding layer is greater than 5 lbf/in.

12. The cable of claim 10, further comprising a layer of fabric tape surrounding the extruded layer of lead, wrapped tightly between the extruded layer of lead and the jacket material.

13. The cable of claim 10, wherein the thin bonding layer is conductive.

14. The cable of claim 10, wherein the thin bonding layer is non-conductive.

15. An electric submersible pump assembly, comprising:
- an electric submersible pump;
- a motor connected to the electric submersible pump;
- a high voltage electrical cable connected to the motor for supplying electrical power to the motor, the electrical cable having:
- a plurality of solid conductors for conducting electricity along a length of the cable at a voltage greater than 5 kV;
- a layer of insulation uniformly and firmly bonded to each of the plurality of solid conductors with a thin bonding layer applied directly over each of the plurality of solid conductors, wherein the bonding layer is between 0.00002 inches and 0.005 inches thick and the bond strength of the bonding layer is greater than 5 lbf/in;
- a layer of conductive paint applied directly over and surrounding each of the layers of insulation;
- a first layer of electrically conductive fabric tape wrapped tightly surrounding each of the layers of conductive paint insulation;
- an extruded layer of lead surrounding each of the first layers of electrically conductive fabric tape;
- a second layer of fabric tape wrapped tightly surrounding each of the extruded layers of lead;
- a single layer of jacket material surrounding all of the second layers of fabric tape; and
- an outer armor surrounding the layer of jacket material.

16. The cable of claim 15, wherein the thin bonding layer is non-conductive.

17. The cable of claim 15, wherein the thin bonding layer is conductive.

* * * * *